3,639,542
ESTER-CONTAINING POLYOLS HAVING HALOGEN AND PHOSPHORUS ATOMS THEREIN
Louis C. Pizzini, Trenton, and William W. Levis, Jr., Wyandotte, Mich., assignors to BASF Wyandotte Corporation, Wyandotte, Mich.
No Drawing. Filed May 13, 1968, Ser. No. 728,840
Int. Cl. C07f 9/08, 9/50; C08g 22/44
U.S. Cl. 260—952                                    6 Claims

ABSTRACT OF THE DISCLOSURE

Ester-containing polyols are prepared by the reaction of polyhydroxyl-containing phosphorus compounds with halogen-containing organic acid anhydrides and alkylene oxides. The polyols are particularly useful in the preparation of flame-retardant rigid polyurethane foams.

---

The present invention relates to ester-containing polyols and to the use thereof in the preparation of urethane compositions. More particularly, the invention relates to ester-containing polyols having a combination of halogen and phosphorus atoms chemically bound therein and to the use thereof in the preparation of flame-retardant polyurethane foams.

It has become increasingly important to impart flame-resistant properties to polyurethane plastics. This is particularly true where cellular polyurethanes are used, for example, as insulation, and to prevent the risk of fire in the daily use of other items. Numerous methods are known for imparting flame-resistant properties to polyurethane plastics. For example, in the production of the cellular polyurethanes, one may use halogenated compounds or derivatives of acids of phosphorus as the active hydrogen-containing component and thus impart flame resistance. It is also possible to use compounds of antimony or boron. Moreover, non-reactive phosphorus or halogen-containing compounds may be used as additives for this purpose. All of these substances are capable of imparting some flame-resistant properties to polyurethane foam plastics. The disadvantage associated with all of these methods is that the use of increasing quantities leads to a serious impairment of the mechanical and physical properties of the cellular polyurethanes. Moreover, as the quantity of the flame-resisting agents is increased, the problem of mixing the component containing the flame-resisting agent with the balance of the components leading to the production of a cellular polyurethane plastic is increased.

It is an object of the present invention to provide novel ester-containing polyols which impart flame-resistant properties to polyurethane compositions and which are substantially devoid of the foregoing disadvantages. It is a further object of the invention to provide polyols containing both halogen and phosphorus atoms. Still another object of the present invention is to provide polyurethane compositions useful in the preparation of foams, adhesives, binders, laminates, and coatings. These and other objects of the present invention will be apparent from the specification and examples which follow.

The above objects are accomplished in accordance with the present invention by providing novel ester-containing polyols having both halogen and phosphorus atoms chemically bound therein. The novel ester-containing polyols of the present invention are prepared by the reaction of a polyhydroxyl-containing phosphorus compound with a halogen-containing organic acid anhydride and an alkylene oxide.

As mentioned above, there are three essential reactants employed in the preparation of the ester-containing polyols of the present invention, namely, a polyhydroxyl-containing phosphorus compound, a halogen-containing organic acid anhydride, and an alkylene oxide. Alkylene oxides which may be employed in the preparation of the ester-containing polyols of the present invention include ethylene oxide, propylene oxide, the isomeric normal butylene oxides, hexylene oxide, octylene oxide, dodecene oxide, methoxy and other alkoxy propylene oxides, styrene oxide, and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

Illustrative polyhydroxyl-containing phosphorus compounds which may be employed in the preparation of the ester-containing polyols of the present invention include phosphate polyols, phosphite polyols, phosphonate polyols, phosphinate polyols, phosphoramidates, and polyhydroxyl-containing phosphine oxides. Typical phosphate polyols are those prepared (1) by the reaction of alkylene oxides with (a) phosphoric acids having a $P_2O_5$ equivalency of from 72 to 95 percent, (b) partial esters of these acids, or (c) esters prepared by the reaction of phosphorous pentoxide and alcohols; (2) by the oxidation of phosphites prepared by the reaction of trialkyl phosphites with polyhydroxyl-containing materials; and (3) by transesterifying the reaction products of (1) and (2). The preparation of these neutral phosphate polyols is known in the art as evidenced by U.S. Patent Nos. 3,375,305, 3,369,060, 3,324,202, 3,317,639, 3,317,510, 3,099,676, 3,081,331, 3,061,625, and 2,909,559, and allowed U.S. application Ser. Nos. 401,232 and 346,992 now U.S. Patent Nos. 3,417,164 and 3,393,254.

Typical phosphite polyols are those prepared (1) by the reaction of alkylene oxides with phosphorous acid, (2) by the reaction of trialkylphosphites with polyhydroxyl-containing materials, and (3) by transesterifying the reaction products of (1) and (2). The preparation of these phosphite polyols is known in the art as evidenced by U.S. Patent Nos. 3,359,348, 3,354,241, 3,352,947, 3,351,683, 3,320,337, 3,281,502, 3,246,051, 3,081,331, and 3,009,939.

Typical phosphonate polyols are those prepared (1) by the reaction of alkylene oxides with phosphonic acid, (2) by the reaction of phosphite polyols with alkyl halides, (3) by the condensation of dialkyl phosphites with alkanolamines and formaldehyde, and (4) by the transesterifying the products of (1), (2), and (3). The preparation of these phosphonate polyols is known in the art as evidenced by U.S. Patent Nos. 3,349,150, 3,330,888, 3,342,651, 3,139,-450, and 3,092,651.

Typical phosphinate polyols include (1) hydroxyalkyl phosphinic acids, (2) reaction products of alkylene oxides and hydroxyalkyl phosphinic acids, and (3) transesterified reaction products of (2). The preparation of these phosphinate polyols is known in the art as evidenced by U.S. Patent No. 3,316,333.

Typical phosphoramidates include those disclosed in U.S. Patent Nos. 3,335,129, 3,278,653, and 3,088,966. Typical polyhydroxyl-containing phosphine oxides include the di- and tri-substituted hydroxylalkyl phosphine oxides such as trihydroxylmethyl phosphine oxides.

Any of the alkylene oxides mentioned above for use in the present invention as well as mixtures thereof may be employed in the preparation of the polyhydroxyl-containing phosphorus compounds. Mixtures of any of the above polyhydroxyl-containing phosphorus compounds may also be employed in the present invention.

The third reactant employed in the preparation of the ester-containing polyols is a halogen-containing organic acid anhydride. Typical anhydrides are halogenated polycarboxylic acid anhydrides such as dichloromaleic anhydride,
tetrabromophthalic anhydride,
tetrachlorophthalic anhydride,
1,4,5,6,7,7-hexachlorobicyclo(2.2.1)-5-heptene-2,3-dicarboxylic anhydride, hereinafter called chlorendic anhydride,
1,4,5,6,7,7-hexachloro-2-methylbicyclo(2.2.1)-5-heptene-2,3-dicarboxylic anhydride,
1,4,5,6,7,7-hexachlorobicyclo(2.2.1)-5-heptene-2-acetic-2-carboxylic anhydride,
5,6,7,8,9,9-hexachloro-1,2,3,4,4a,5,8,8a-octahydro-5,8-methano-2,3-naphthalene dicarboxylic anhydride, and
1,2,3,4,5,6,7,7-octachloro-3,6-methano-1,2,3,6-tetrahydrophthalic anhydride.

Mixtures of any of the above anhydrides may also be employed in the present invention.

The ester-containing polyols of the present invention are generally prepared by heating the three reactants at temperatures between 50° C. and 150° C., preferably between 75° C. to 150° C., for 0.5 to 10 hours. Temperatures below 150° C. must be maintained to prevent the reaction of carboxy and hydroxy groups with the formation of water. The reaction is generally carried out under from 0 to 100 p.s.i.g. Alternatively, the polyhydroxyl-containing phosphorus compound and the halogen-containing organic acid anhydride may be added to a reaction vessel and heated to 50° C. to 150° C. for zero to ten hours. Thereafter, the alkylene oxide is added to the reaction mixture under pressure while maintaining the reaction temperature of between 75° C. and 150° C. After completion of the reaction, the reaction mixture may be filtered and is stripped of volatiles by heating for about one-half hour to three hours at 80° to 110° C. under less than 10 mm. of mercury. If desired, a solvent inert to the reaction may be employed in the preparation of the polyols of the present invention.

The amounts of reactants employed in the preparation of the ester-containing polyols of the present invention may vary. Generally, however, a mole ratio of phosphorus compound to anhydride of from 1:0.1 to 1:3 will be employed. The amount of alkylene oxide employed will be such to reduce the acid number of the phosphorus polyol-anhydride reaction product to five or less, preferably one or less. The hydroxyl number of the ester-containing polyol will vary considerably. Generally, however, the polyols will have a hydroxyl number of from about 20 to 600, preferably from about 40 to 400.

In a preferred embodiment of the present invention, the foregoing ester-containing polyols are employed in the preparation of polyurethane compositions, particularly polyurethane foams. The resulting polyurethane products exhibit marked improvements in flame-retardant properties without impairment of the other physical properties of the products. The polyurethane products are generally prepared by the reaction of the ester-containing polyol with an organic polyisocyanate, optionally in the presence of additional polyhydroxyl-containing components, chain-extending agents, catalysts, surface-active agents, stabilizers, blowing agents, fillers, and pigments. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one shot" techniue of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate,
tolylene-2,4-diisocyanate,
tolylene-2,6-diisocyanate,
mixtures of 2,4- and 2,6-hexamethylene-1,6-diisocyanate,
tetramethylene-1,4-diisocyanate,
cyclohexane-1,4-diisocyanate,
hexahydrotolylene diisocyanate (and isomers),
naphthylene-1,5-diisocyanate,
1-methoxyphenyl-2,4-diisocyanate,
dihphenylmethane-4,4'-diisocyanate,
4,4'-biphenylene diisocyanate,
3,3'-dimethoxy-4,4'-biphenyl diisocyanate,
3,3'-dimethyl-4,4'-biphenyl diisocyanate, and
3,3'-dimethyldiphenylmethane-4,4'-diisocyanate;
the triisocyanates such as 4,4',4''-triphenylmethane triisocyanate,
polymethylene polyphenylisocyanate and
tolylene 2,4,6-triisocyanate;
and the tetraisocyanates such as
4,4'-dimethyldiphenylmethane 2,2',5,5'-tetraisocyanate.

Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Patent No. 3,215,652.

As mentioned above, the ester-containing polyol may be employed as the sole polyhydroxyl-containing component or it may be employed along with the polyhydroxyl-containing components commonly employed in the art. Representative of these components are hydroxyl-containing polyesters, polyalkylene polyether polyols, hydroxy-terminated polyurethane polymers, polyhdric polythioethers, polyacetals, aliphatic polyols, aliphatic thiols including alkane, alkene, and alkyne thiols having two or more —SH groups; diamines including both aromatic, aliphatic, and heterocyclic diamines, as well as mixtures thereof. Compounds which contain two or more different groups within the above-defined classes may also be used such as, for example, amino alcohols which contain an amino group and a hydroxyl group. Also compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophathalic acid, terephthalic acid, hemimellitic acid, and 1,4-cyclohexane-dicarboxylic acid. Any suitable polyhydric alcohol including both aliphatic and aromatic may be used such as ethylene glycol, 1,3 - propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane - 1,2,6-triol, α-methyl glucoside, pentaerythritol, and sorbitol. Also included within the term "polyhydric alcohol" are compounds derived from phenol such as 2,2-(4,4'-hydroxyphenyl) propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)-propane and blends thereof having equivalent weights of from 250 to 5000.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxy-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-diamino naphthalene, and 2,4-diamino toluene; aliphatic polyamines such as ethylene diamine, 1,3-propylene diamine, 1,4-butylene diamine, and 1,3-butylene diamine. Alkylene oxide adducts of any of the above polyamines may also be used, particularly propylene oxide adducts of p-amino aniline and ethylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine, 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, morpholine, and dodecahydro-1,4,7,9b-tetraazaphenalene.

Any suitable catalyst may be used including tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethylamino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. No. 2,846,408.

A wetting agent or surface-active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following examples illustrate the nature of the invention. All parts are by weight unless otherwise stated.

EXAMPLE I

A reaction vessel equipped wtih a thermometer, stirrer, nitrogen source, and heat exchange means was charged with 862 parts of tetrachlorophthalic anhydride and 1282 parts of a phosphate polyol having a hydroxyl number of 425 prepared by the reaction of six moles of propylene oxide with one mole of 100% phosphoric acid. The reaction vessel was then purged with nitrogen, vented to zero p.s.i.g., and sealed. The reaction mixture was then heated to 80° C. and maintained at this temperature for 0.5 hour. Over a four-hour period, 356 parts of propylene oxide was then added to the reaction mixture maintaining the temperature of the mixture at 80° C. The pressure during the reaction was between 10–15 p.s.i.g. After completion of the oxide addition, the reaction mixture was stirred for three hours at 80° C. The reaction mixture was then filtered through a celite bed and stripped of volatiles by heating for one hour at 80° C. under a pressure of less than 10 mm. of mercury. The product had the following properties: hydroxyl number—205; molecular weight—820; acid number—0.27; 3.8% phosphorus; and 17.4% chlorine.

EXAMPLE II

A reaction vessel equipped as described in Example I was charged with 464 parts of tetrabromophthalic anhydride and 2.5 parts of anhydrous sodium acetate and 425 parts of a phosphate polyol having a hydroxyl number of 395 prepared by the reaction of six moles of propylene oxide with one mole of 100% phosphoric acid. The reaction vessel was then purged with nitrogen, vented to zero p.s.i.g., sealed, and heated to 80° C. Over a three-hour period, 93 parts of propylene oxide was then added to the reaction mixture maintaining the temperature of the mixture at 80° C. The pressure during the reaction was between 10–15 p.s.i.g. After completion of the oxide addition, the reaction mixture was stirred for three hours at 80° C. The reaction mixture was then filtered through a coarse filter paper and stripped of volatiles by heating for one hour at 80° C. under a pressure of less than 10 mm. of mercury. The product had the following properties: hydroxyl number—176.6; molecular weight—953; acid number—0.6; 3.3% phosphorus, and 31.2% bromine.

EXAMPLE III

A reaction vessel equipped as described in Example I was charged with 371 parts of chlorendic anhydride and 425 parts of a phosphate polyol having a hydroxyl number of 395 prepared by the reaction of six moles of propylene oxide with one mole of 100% phosphoric acid. The reaction vessel was then purged with nitrogen, vented to zero p.s.i.g., and sealed. The reaction mixture was then heated to 125° C. and maintained at this temperature for 0.25 hour. Over a four-hour period, 118 parts of propylene oxide was then added to the reaction mixture maintaining the temperature of the mixture at 125° C. The pressure during the reaction was between 10–15 p.s.i.g. After completion of the oxide addition, the reaction mixture was stirred for three hours at 125° C. The reaction mixture was stripped of volatiles by heating for one hour at 125° C. under a pressure of less than 10 mm. of mercury. The product had the following properties: hydroxyl number—196; molecular weight—859; acid number—0.1; 3.6% phosphorus; and 24.8% chlorine.

EXAMPLE IV

A reaction vessel equipped as described in Example I was charged with 232 parts of tetrabromophthalic anhydride, and 425 parts of a phosphate polyol having a hydroxyl number of 395 prepared by the reaction of six moles of propylene oxide with one mole of 100% phosphoric acid. The reaction vessel was then purged with nitrogen, vented to zero p.s.i.g., sealed, and heated to 80° C. Over a four-hour period, 116 parts of propylene oxide was then added to the reaction mixture maintaining the temperature of the mixture at 80° C. The pressure during the reaction was between 10–15 p.s.i.g. After completion of the oxide addition, the reaction mixture was stirred for three hours at 80° C. The reaction mixture was stripped of volatiles by heating for one hour at 80° C. under a pressure of less than 10 mm. of mercury. The product had the following properties: hydroxyl number—187; molecular weight—903; acid number—2.4; 3.44% phosphorus; 17.5% bromine; and 7.9% chlorine.

EXAMPLE V

A reaction vessel equipped as described in Example I was charged with 286 parts of tetrachlorophthalic anhydride and 500 parts of a phosphate polyol having a hydroxyl number of 281 prepared by the reaction of propylene oxide with 115% phosphoric acid. The reaction vessel was then purged with nitrogen, vented to zero p.s.i.g., and sealed. The reaction mixture was then heated to 80° C. and maintained at this temperature for 0.5 hour. Over a two-hour period, 116 parts of propylene oxide was then added to the reaction mixture maintaining the temperature of the mixture at 80° C. The pressure during the reaction was between 10–15 p.s.i.g. After completion of the oxide addition, the reaction mixture was stirred for one hour at 80° C. The reaction mixture was stripped of volatiles by heating for one hour at 80° C. under a pressure of less than 10 mm. of mercury. The product had the following properties: hydroxyl number —155; acid number—0.35; 16.6% chlorine; and 5.1% phosphorus.

EXAMPLE VI

A reaction vessel equipped as described in Example I was charged with 2319 parts of chlorendic anhydride and 3230 parts of a phosphate polyol having a hydroxyl number of 281 prepared by the reaction of propylene oxide with 115% phosphoric acid. The reaction vessel was then purged with nitrogen, vented to zero p.s.i.g., and sealed. The reaction mixture was then heated to 125° C. and maintained at this temperature for three hours. Over a two-hour period, 451 parts of propylene oxide was then added to the reaction mixture maintaining the temperature of the mixture at 125° C. The pressure during the reaction was between 10–15 p.s.i.g. After completion of the oxide addition, the reaction mixture was stirred for three hours at 125° C. The reaction mixture was stripped of volatiles by heating for one hour at 80° C. under a pressure of less than 10 mm. of mercury. The product had the following properties: hydroxyl number—136; acid number—2.2; 21.9% chlorine; and 5.2% phosphorus.

EXAMPLE VII

The procedure of Example I is duplicated with the exception that the following polyhydroxyl-containing phosphorus compounds are substituted for the phosphate polyol employed in Example I.

(a) 1566 parts of a phosphate polyol having a molecular weight of 522 prepared by the reaction of propylene oxide with phosphorus pentoxide and n-butanol.
(b) 1680 parts of a phosphate polyol having a molecular weight of 560 prepared by the reaction of epichlorohydrin with 100% phosphoric acid.
(c) 1290 parts of a phosphate polyol having a molecular weight of 430 prepared by the reaction of trimethyl phosphite with dipropylene glycol.
(d) 775 parts of a phosphonate polyol having a molecular weight of 258 prepared by the condensation of triethylphosphite with formaldehyde and diethanolamine.
(e) 1350 parts of a phosphonate polyol having a molecular weight of 450 prepared by the reaction of (c) above with methylchloride.
(f) 1425 parts of a phosphinate polyol having a molecular weight of 475 prepared by the reaction of propylene oxide with bis(hydroxymethyl) phosphinic acid.
(g) 1475 parts of the phosphoramidate prepared as described in Example IX of U.S. 3,335,129.
(h) 425 parts of tris(hydroxymethyl)phosphine oxide.

All of the polyols may be employed in the preparation of polyurethane products which possess flame-retardant properties. The polyols are particularly useful in the preparation of flame-retardant rigid polyurethane foams.

EXAMPLES VIII–XI

A series of polyurethane foams was prepared employing the ester-containing polyols described in Examples I–IV as one component thereof. The foams were prepared by the "one-shot" method. The particular ingredients employed in the preparation of the foams and amounts thereof as well as physical properties of the foams are presented in Table I below. All of the rigid foams prepared were non-burning. Moreover, no problems were encountered in mixing and/or spraying the components during the preparation of the foams. This was particularly unexpected since large amounts of the ester-containing polyols were employed in the foam preparations.

TABLE I.—POLYURETHANE FOAM PREPARATIONS

| Example | VIII | IX | X | XI |
|---|---|---|---|---|
| Components, parts: | | | | |
| Polymethylene polyphenylisocyanate | 83.5 | 69.0 | 73.0 | 81.5 |
| Polyol: | | | | |
| A | 25.0 | | | 25.0 |
| B | | 25.0 | 25.0 | |
| Ester-containing polyol of Example: | | | | |
| I | 75.0 | | | |
| II | | 75.0 | | |
| III | | | 75.0 | |
| IV | | | | 75.0 |
| Silicone surfactant | 1.5 | 1.5 | 1.5 | 1.5 |
| Tetramethylene ethylene diamine | 2.0 | 2.0 | 2.0 | 2.0 |
| Trifluorochloromethane | 27.0 | 29.0 | 27.0 | 29.0 |
| Foam properties: | | | | |
| Density, pounds per cubic ft | 2.00 | 2.07 | 1.96 | 2.07 |
| Closed cell content, percent | 90 | 91 | 93 | 94 |
| Flame test, ASTM D-1692-67T, inches burned | 0.6 | 0.5 | 0.4 | 0.5 |
| Humid aging, 158° F. 100% R.H., percent volume change: | | | | |
| 1 day | 16 | 16 | 24 | 1 |
| 2 days | 19 | 19 | 26 | 1 |
| 7 days | 27 | 34 | 47 | 22 |
| 28 days | 47 | 53 | 72 | 34 |
| Butler chimney test: | | | | |
| Percent weight retention | 69 | 64 | 74 | 78 |
| Flame height | D | C | C | C |
| Seconds to self-extinguishing | 12 | 10 | 10 | 10 |

NOTE.—Polyol A=A polyalkylene ether polyol having a molecular weight of about 825 prepared by the condensation of 8.5 moles of propylene oxide with one mole of sucrose; Polyol B=A polyalkylene ether polyol having a molecular weight of about 500 prepared by the condensation of 6.5 moles of propylene oxide with one mole of a mixture of toluene diamine isomers.

What is claimed is:

1. An ester-containing polyol prepared by the reaction at a temperature between 50° C. and 150° C. for 0.5 hour to 10 hours of
    (a) a neutral phosphate polyol obtained by the reaction of propylene oxide with a phosphoric acid having a $P_2O_5$ equivalency of from 72% to 95% with
    (b) a halogen-containing organic acid anhydride selected from the group consisting of tetrachlorophthalic anhydride, tetrabromophthalic anhydride, 1,4,5,6,7,7 - hexachlorobicyclo(2.2.1) - 5 - heptene-2,3 - dicarboxylic anhydride and mixtures thereof, and
    (c) propylene oxide,
the mole ratio of (a) to (b) being from 1:0.1 to 1:1, the amount of propylene oxide employed being such to reduce the acid number of the phosphate polyol-anhydride reaction mixture to one or less.

2. The ester-containing polyol of claim 1 wherein the phosphate polyol is derived from 100% phosphoric acid.

3. The ester-containing polyol of claim 1 wherein the mole ratio of (a) to (b) is 1:1.

4. The ester-containing polyol of claim 1 wherein the halogen-containing organic acid anhydride is tetrabromophthalic anhydride.

5. The ester-containing polyol of claim 1 wherein (a) is prepared by the reaction of propylene oxide with 100% phosphoric acid, (b) is tetrabromophthalic anhydride, and the ratio of (a) to (b) is 1:1.

6. A process for the preparation of an ester-containing polyol of claim 1 which comprises reacting at a temperature of from 50° C. to 150° C. for 0.5 hour to 10 hours
    (a) a neutral phosphate polyol obtained by the reaction of propylene oxide with a phosphoric acid having a $P_2O_5$ equivalency of from 72% to 95% with
    (b) a halogen-containing organic acid anhydride selected from the group consisting of tetrachlorophthalic anhydride, tetrabromophthalic anhydride, 1,4,5,6,7,7 - hexachlorobicyclo(2.2.1) - 5 - heptene-2,3 - dicarboxylic anhydride and mixtures thereof, and
    (c) propylene oxide,
the mole ratio of (a) to (b) being from 1:0.1 to 1:1, the amount of propylene oxide being such to reduce the acid number of the phosphate polyol-anhydride reaction mixture to one or less.

References Cited

UNITED STATES PATENTS 3,419,642 12/1968 McGary et al. _____ 260—952
3,465,068 9/1969 Camacho et al. _____ 260—952

CHARLES B. PARKER, Primary Examiner

A. H. SUTTO, Assistant Examiner

U.S. Cl. X.R.

260—2.5 AJ, 606.5 P